Jan. 2, 1940.   R. J. HARRY   2,185,664
JOURNAL BEARING
Filed Dec. 2, 1937   2 Sheets-Sheet 2
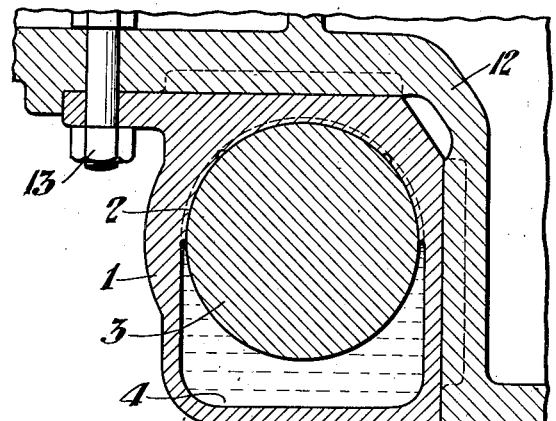
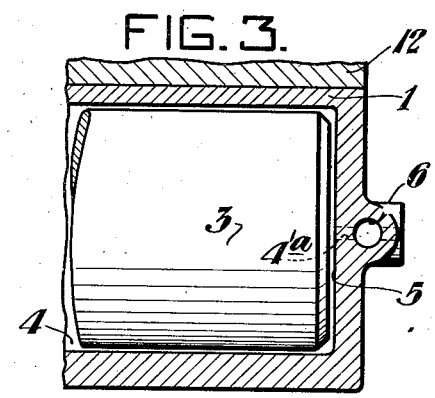
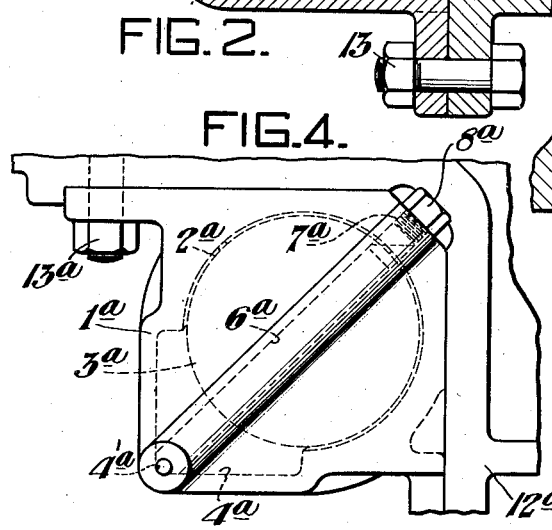
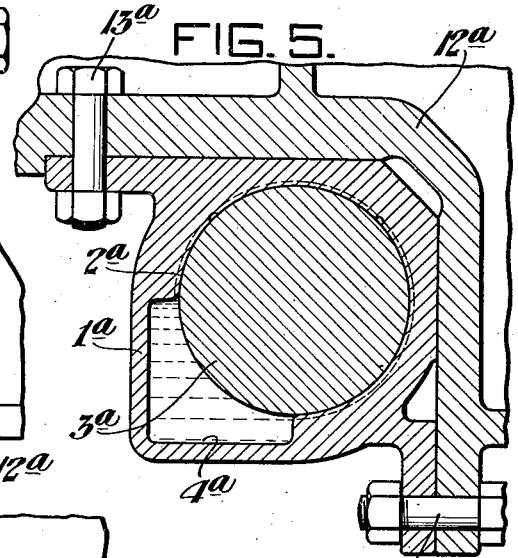
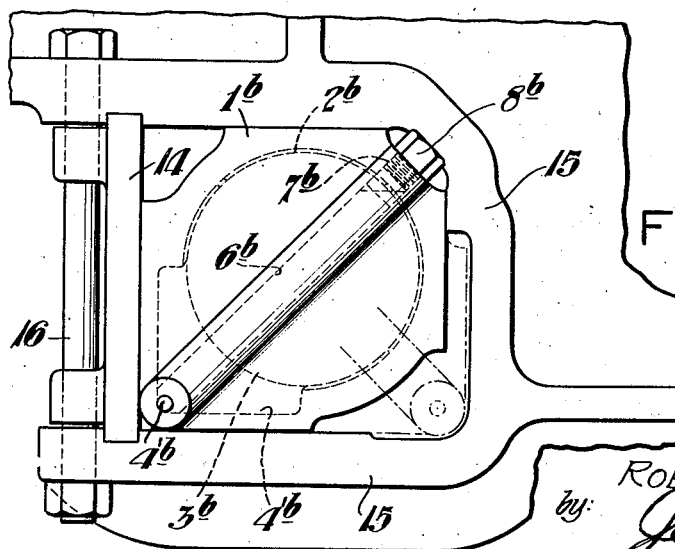
Inventor:
Robert J. Harry,
by John E. Jackson
His Attorney.

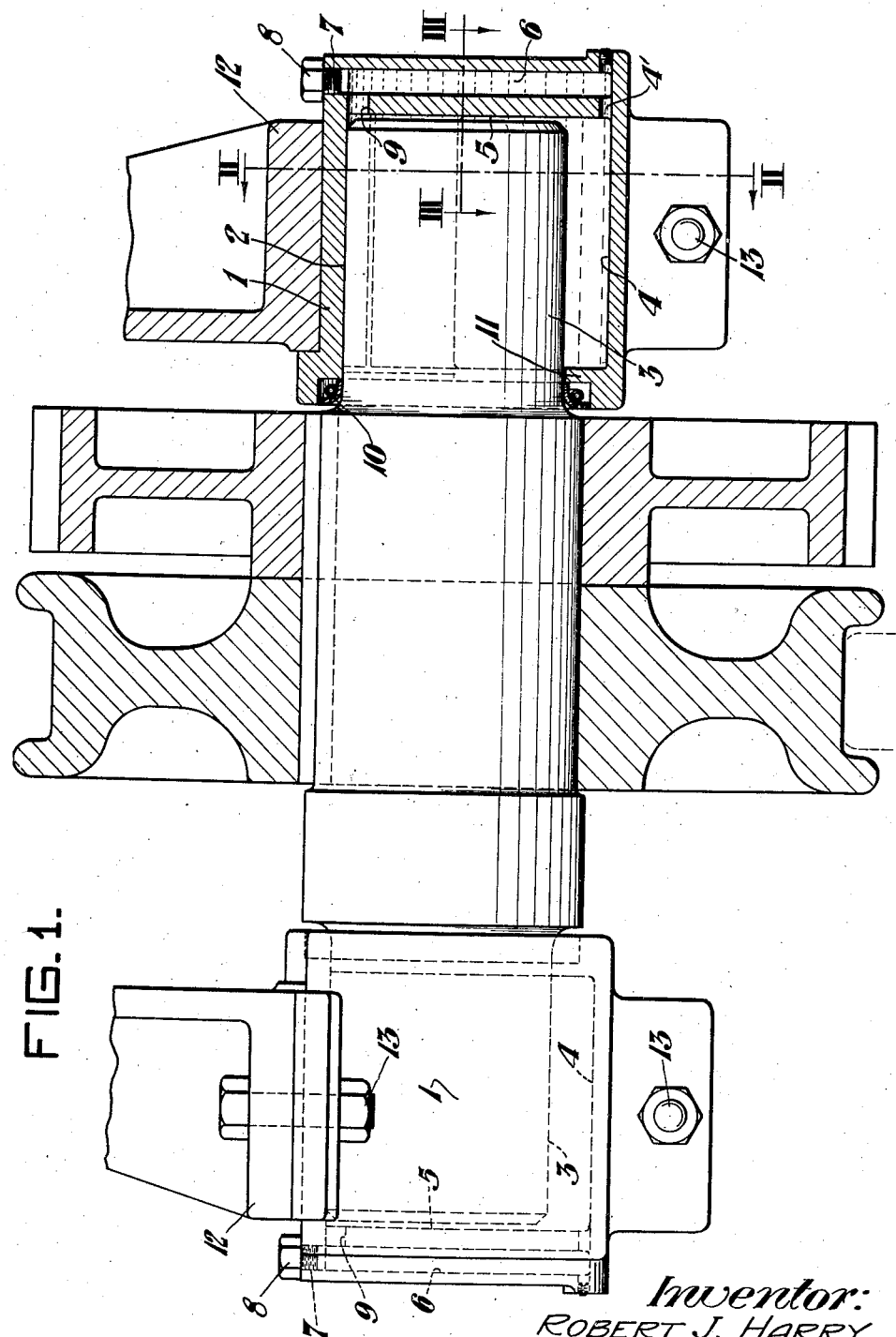

Patented Jan. 2, 1940

2,185,664

UNITED STATES PATENT OFFICE

2,185,664

JOURNAL BEARING

Robert J. Harry, Alliance, Ohio, assignor to The Alliance Machine Company, a corporation of Ohio Application December 2, 1937, Serial No. 177,730

7 Claims. (Cl. 308—79)

This invention relates to journal bearings, and particularly to such bearings capable of accepting thrust, one of the objects being to provide a self-contained bearing of this character having a long service life and requiring very little attention during use.

Specific examples of the invention are illustrated by the accompanying drawings, in which:

Figure 1 is a view showing the journals of an axle shaft journaled by the first example of the new bearing, one of the bearings being in elevation and the other in longitudinal section.

Figure 2 is a cross-section taken from the line II—II in Figure 1.

Figure 3 is a section taken from the line III—III in Figure 1.

Figures 4 and 5 are, respectively, end elevation and cross-sectional views of a second example of the invention.

Figure 6 is an end elevation of a third example of the invention.

In the first example, the bearing consists of a unitary block 1 having a bore 2 receiving a journal 3. The top of this bore is semi-cylindrical and provides a radial bearing surface, the bottom being in the form of a rectangular pocket 4 and the end providing a thrust surface 5 for the journal end. The pocket 4 communicates by way of a duct 4' with a vertical lubricant reservoir 6 to which lubricant may be introduced by way of an externally accessible opening 7 normally closed atmospherically air-tight by a screw 8. The top of the reservoir 6 is open to the thrust surface 5 by way of a duct 9, which is considerably larger than the duct 4'. An oil seal 10 works against the journal 3 at the open end of the bore 2 to prevent loss of lubricant, a wall or flange 11 closing off this end of the pocket 4.

The journal 3 carries the wheel of a carriage, the latter being supported through a part 12 to which the block 1 is fixed by suitable means. such as screw members 13.

In use, the pocket 4 and reservoir 6 are filled with relatively fluid lubricant, this being done so that there is a slight air space between the top level of the lubricant at the duct 9 and the bottom of the screw 8. As the journal 3 rotates it draws the lubricant up from the pocket 4 into the space between the journal and the radial bearing surface. When the bearing is initially filled with lubricant the latter naturally fills into the space between the end of the journal 3 and the thrust surface 5. Then, as the journal 3 develops end play, it works against the lubricant between its end and the surface 5 so as to cause it to squirt radially of the same, a considerable amount of the displaced lubricant forcing its way through the duct 9 and into the reservoir 6. As this action continues the lubricant in the reservoir 6 increases in height, due to the fact that the duct 4' is so much smaller than the duct 9, and produces a pneumatic pressure between its top and the bottom of the screw 8, thus exerting a cushioning action which resists, by way of the interconnecting lubricant, the thrust of the journal 3. Furthermore, it causes a continual circulation of lubricant, since a head is maintained in the reservoir whereby the lubricant is continuously flowing into the pocket 4.

The second example is substantially like the first, and similar numerals followed by the letter *a* are therefore used for identification purposes.

This modification consists in making a 270 degree radial bearing surface instead of a 180 degree surface, as in the case of the first example. This requires a reduction in the size of the pocket 4a and the placing of it in one corner instead of in the bottom, the reservoir 6a angling diagonally across the bearing at 45 degrees. The advantage of this modification is that when the top of the radial bearing surface, which carries the working pressure, becomes worn, it is possible to release the screw members 13a and reverse the bearing blocks 1a, it being understood that in most installations it will be necessary to use two bearing blocks on opposite ends of the journaled shaft, whereby such reversal is possible by substitution of one for the other. This brings a new bearing surface into place and greatly prolongs the service life of the bearing. The same lubricating action described in connection with the first example is inherent in this modification.

The second modification is substantially the same as the first modification and similar numerals, followed by the letter *b*, are therefore used. However, it will be noted that this bearing is retained in position by means of a plate 14, it being necessary to use a modified carriage part 15. This plate 14 being held in position by means of screw members 16, can be removed upon removal of these members, whereupon the bearing may be removed from the part 15, turned through 90 degrees, reinserted in the part 15 and again retained by the plate 14 and screw members 16. This modification is not described in greater detail because it involves the same thought as does the first modification.

I claim:

1. A journal bearing including a radial bearing surface closed at one end by a thrust surface for the journal end and provided with a lubricant seal for closing its other end about the journal, said bearing having a lubricant reservoir with a duct communicating with said thrust surface above the journal bottom in offset relation respecting the journal axes and a duct communicating with the inside of said bearing at a lower position, said reservoir gravitationally feeding through the second named duct when containing a sufficient lubricant head, the first named duct being positioned so that end play of the journal against said thrust surface forces lubricant into the same to maintain said lubricant head.

2. A journal bearing including a radial bearing surface closed at one end by a thrust surface for the journal end and provided with a lubricant seal for closing its other end about the journal, said bearing having a lubricant reservoir with a duct communicating with said thrust surface above the journal bottom in offset relation respecting the journal axis and a duct communicating with the inside of said bearing at a lower position, said reservoir gravitationally feeding through the second named duct when containing a sufficient lubricant head, the first named duct being positioned so that end play of the journal against said thrust surface forces lubricant into the same to maintain said lubricant head, and said reservoir being atmospherically air-tight to effect pneumatic journal end play restraint when partially filled with lubricant.

3. A journal bearing integrally including a radial bearing surface provided with a lubricant pocket and an elongated lubricant reservoir gravitationally feeding to said pocket, said bearing having mounting means permitting it to be turned approximately 90 degrees whereby when functioning substantially vertically down on the journal it may be turned to prolong its service life, said reservoir being positioned at an angle of approximately 45 degrees, so as to gravitationally feed to said pocket regardless of the working position of said bearing and said pocket being positioned below and to one side of the journal center and so as to be free from at least a majority of said surface whereby not to interfere when said bearing is turned.

4. A horizontal journal bearing including a radial bearing surface having a lubricant pocket beneath its horizontal center line closed at one end by a thrust surface for the journal end and provided with a lubricant seal for closing its other end about the journal, said bearing having an upwardly positioned lubricant reservoir on the outer side of said thrust surface with a duct communicating with the latter adjacent its top and a duct communicating with said pocket, said reservoir gravitationally feeding lubricant through the second named duct to said pocket when containing a sufficient lubricant head, the first named duct feeding lubricant displaced by end play of the journal end against said thrust surface to said reservoir to maintain said head therein.

5. A horizontal journal bearing including a radial bearing surface having a lubricant pocket beneath its horizontal center line closed at one end by a thrust surface for the journal end and provided with a lubricant seal for closing its other end about the journal, said bearing having an upwardly positioned lubricant reservoir on the outer side of said thrust surface with a duct communicating with the latter adjacent its top and a duct communicating with said pocket, said reservoir gravitationally feeding lubricant through the second named duct to said pocket when containing a sufficient lubricant head, the first named duct feeding lubricant displaced by end play of the journal end against said thrust surface to said reservoir to maintain said head therein, said reservoir being atmospherically air-tight and providing an air space above the first named duct to effect pneumatic journal end play restraint when filled with lubricant to the level of the first named duct.

6. A horizontal journal bearing including a radial bearing surface having a lubricant pocket beneath its horizontal center line closed at one end by a thrust surface for the journal end and provided with a lubricant seal for closing its other end about the journal, said bearing having an upwardly positioned lubricant reservoir on the outer side of said thrust surface with a duct communicating with the latter adjacent its top and a duct communicating with said pocket, said reservoir gravitationally feeding lubricant through the second named duct to said pocket when containing a sufficient lubricant head, the first named duct feeding lubricant displaced by end play of the journal end against said thrust surface to said reservoir to maintain said head therein, said pocket being free from at least 270 degrees of said radial bearing surface and positioned to one side of the vertical center line of the latter and said reservoir extending from said pocket diagonally upwardly, said bearing having mounting means permitting it to be turned at least 90 degrees so as to prolong its service life.

7. A horizontal journal bearing including a radial bearing surface having a lubricant pocket beneath its horizontal center line closed at one end by a thrust surface for the journal end and provided with a lubricant seal for closing its other end about the journal, said bearing having an upwardly positioned lubricant reservoir on the outer side of said thrust surface with a duct communicating with the latter adjacent its top and a duct communicating with said pocket, said reservoir gravitationally feeding lubricant through the second named duct to said pocket when containing a sufficient lubricant head, the first named duct feeding lubricant displaced by end play of the journal end against said thrust surface to said reservoir to maintain said head therein, said pocket being free from at least 270 degrees of said radial bearing surface and positioned to one side of the vertical center line of the latter and said reservoir extending from said pocket diagonally upwardly, said bearing having mounting means permitting it to be turned at least 90 degrees so as to prolong its service life, said reservoir being atmospherically air-tight and providing an air space above the first named duct to effect pneumatic journal end play restraint when filled with lubricant to the level of the first named duct.

ROBERT J. HARRY.